(12) United States Patent
Hayashi

(10) Patent No.: US 8,034,468 B2
(45) Date of Patent: Oct. 11, 2011

(54) TRANSLUCENT CERAMIC, METHOD FOR PRODUCING THE SAME, OPTICAL COMPONENT, AND OPTICAL DEVICE

(75) Inventor: Takeshi Hayashi, Kyoto-Fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 581 days.

(21) Appl. No.: 12/118,428

(22) Filed: May 9, 2008

(65) Prior Publication Data

US 2008/0233406 A1 Sep. 25, 2008

Related U.S. Application Data

(63) Continuation of application No. PCT/JP2006/321833, filed on Nov. 1, 2006.

(30) Foreign Application Priority Data

Nov. 25, 2005 (JP) .................................. 2005-339678

(51) Int. Cl.
  *B32B 17/06* (2006.01)
  *C04B 35/64* (2006.01)
  *C01F 17/00* (2006.01)
(52) U.S. Cl. ......... 428/701; 428/702; 428/432; 428/472
(58) Field of Classification Search .................. None
  See application file for complete search history.

(56) References Cited

U.S. PATENT DOCUMENTS

| | | | | |
|---|---|---|---|---|
| 5,308,809 | A * | 5/1994 | Baumard et al. | 501/152 |
| 5,723,175 | A * | 3/1998 | Scholz et al. | 427/161 |
| 6,231,991 | B1 | 5/2001 | Maloney | |
| 6,284,323 | B1 * | 9/2001 | Maloney | 427/419.2 |
| 6,921,671 | B1 * | 7/2005 | Zhang et al. | 438/3 |
| 2001/0007719 | A1 * | 7/2001 | Maloney | 428/633 |
| 2002/0028344 | A1 * | 3/2002 | Beele | 428/632 |
| 2002/0155299 | A1 * | 10/2002 | Harris et al. | 428/428 |
| 2002/0172837 | A1 * | 11/2002 | Allen et al. | 428/632 |
| 2003/0148148 | A1 * | 8/2003 | Dietrich et al. | 428/701 |
| 2005/0137076 | A1 * | 6/2005 | Rosenflanz et al. | 501/103 |
| 2005/0162043 | A1 * | 7/2005 | Higuchi et al. | 310/328 |
| 2005/0201422 | A1 * | 9/2005 | Ohta et al. | 372/6 |

(Continued)

FOREIGN PATENT DOCUMENTS

DE 42 18 288 A1 12/1992

(Continued)

OTHER PUBLICATIONS

Merriam Webster's Distionary. Tenth Edition, 1996 p. 1255.*

(Continued)

*Primary Examiner* — Timothy Speer
*Assistant Examiner* — Vera Katz
(74) *Attorney, Agent, or Firm* — Dickstein Shapiro LLP

(57) ABSTRACT

A translucent ceramic having a high linear transmittance and a high refractive index, substantially not causing double refraction, and exhibiting a high anomalous dispersion has a pyrochlore compound represented by the general formula $A_xB_yO_w$ (wherein $1.00 \leq x/y \leq 1.10$ and w represents a positive number maintaining electroneutrality) as a main component. The main component has a cubic crystal system. Preferably, the A site comprises a trivalent metallic element, and the B site comprises a tetravalent metallic element. More preferably, A is at least one of La, Y, Gd, Yb, and Lu, and B is of at least one of Ti, Sn, Zr, and Hf. The translucent ceramic is useful as a material of, for example, an objective lens used in an optical pickup.

7 Claims, 4 Drawing Sheets

U.S. PATENT DOCUMENTS

| | | | |
|---|---|---|---|
| 2006/0179717 A1* | 8/2006 | LaBarge | 48/127.9 |
| 2007/0042546 A1* | 2/2007 | Thomas et al. | 438/257 |
| 2008/0039330 A1* | 2/2008 | Wolf et al. | 505/100 |
| 2008/0169449 A1 | 7/2008 | Mundschau | 252/373 |
| 2008/0261053 A1* | 10/2008 | Arndt et al. | 428/426 |
| 2010/0035037 A1* | 2/2010 | Marlin et al. | 428/220 |

FOREIGN PATENT DOCUMENTS

| | | |
|---|---|---|
| DE | 697 19 701 T2 | 12/2003 |
| EP | 0 848 077 A1 | 6/1998 |
| EP | 0 848 077 B1 | 3/2003 |
| JP | 5127078 | 5/1993 |
| JP | 7244865 | 9/1995 |
| JP | 08 133 728 A | 5/1996 |
| JP | 09 071 420 A | 3/1997 |
| WO | WO-0249984 | 6/2002 |

OTHER PUBLICATIONS

Yaming Ji, et al.: "Fabrication of transparent $La_2Hf_2O_7$ ceramics from combustion synthesized powders"; Materials Research Bulleting, vol. 40, No. 3, Mar. 8, 2005, pp. 553-559.

* cited by examiner

TRANSLUCENT CERAMIC, METHOD FOR PRODUCING THE SAME, OPTICAL COMPONENT, AND OPTICAL DEVICE

This is a continuation of application Serial No. PCT/JP2006/321833, filed Nov. 1, 2006.

TECHNICAL FIELD

The present invention relates to a translucent ceramic useful for optical components such as lenses and a method for producing the same, and an optical component and an optical device using the same.

BACKGROUND ART

Optical components, such as lenses, used in optical pickups and other optical devices are conventionally made of glass, plastic, a single crystal of lithium niobate ($LiNbO_3$), or the like, as disclosed in, for example, Patent Documents 1 and 2.

Glass and plastics have high light transmittances and are easy to form into a desired shape. Accordingly, those materials are mainly used for optical components such as lenses. $LiNbO_3$ single crystal is mainly used for optical components such as optical waveguides on the basis of the electro-optical characteristics and double refraction of the $LiNbO_3$ single crystal.

Optical pickups and other optical devices including such optical components are required to be further downsized and to be thinner. Unfortunately, the refractive indices of conventionally used glass and plastics are 2.00 or less. It is therefore difficult to downsize the optical components and optical devices using such a material and to reduce their thicknesses. In addition, plastics disadvantageously have low moisture resistance, and besides may cause double refraction. It is accordingly difficult for plastics to transmit and concentrate incident light efficiently.

On the other hand, the $LiNbO_3$ single crystal has a high refractive index of 2.3, but may cause double refraction. $LiNbO_3$ single crystal is thus unsuitable for optical components such as lenses, and is limited in application.

For example, Patent Document 3 discloses $Ba(Mg,Ta)O_3$ and $Ba(Zn,Ta)O_3$ translucent ceramics as materials that causes no double refraction and provide superior optical characteristics. These ceramics have refractive indices (hereinafter referred to as refractive indices at a wavelength of 633 nm, unless otherwise specified) of 2.01 or more.

It may be desired that the anomalous dispersion $\Delta\theta g,F$, which is one of the optical characteristics, be high. To have an anomalous dispersion means to have wavelength dispersibility different from normal optical glass, as will be specifically described below. A high anomalous dispersion $\Delta\theta g,F$ is advantageous in correcting chromatic aberration. The anomalous dispersion is represented by a negative number, and a high anomalous dispersion means that its absolute value is high.

Patent Document 3 discloses $Ba(Mg,Ta)O_3$ and $Ba(Zn,Ta)O_3$ translucent ceramics having perovskite structures represented by the general formula $ABO_3$. In particular, the B site of the structure is constituted of at least two elements, and these translucent ceramics have complex perovskite structures. More specifically, the electroneutrality can be substantially maintained by controlling the molar ratio of divalent metallic element(s) mainly constituted of Mg and/or Zn to the pentavalent metallic element(s) of Ta and/or Nb to about 1:2. In addition, the optical characteristics, such as refractive index and Abbe number, can be changed by substituting a tetravalent element, such as Sn or Zr, for the B site elements Mg, Ta, and/or Zn.

However, the translucent ceramics disclosed in Patent Document 3 disadvantageously have a low anomalous dispersion $\Delta\theta g,F$. For example, a $Ba\{(Sn,Zr)Mg,Ta\}O_3$ ceramic has a $\Delta\theta g,F$ value of $-0.013$; a $Ba(Zr,Zn,Ta)O_3$ ceramic has a $\Delta\theta g,F$ value of $-0.006$; a $Ba\{(Sn,Zr)Mg,Nb\}O_3$ ceramic has a $\Delta\theta g,F$ of $-0.000$.

Patent Document 1: Japanese Unexamined Patent Application Publication No. 5-127078 (all pages, FIG. 1)
Patent Document 2: Japanese Unexamined Patent Application Publication No. 7-244865 (Claim 6, paragraph 0024)
Patent Document 3: International Publication No. 02/49984 pamphlet (all pages, all figures)

DISCLOSURE OF INVENTION

Problems to be Solved by the Invention

The present invention has been made in view of the above circumstances, and an object of the invention is to provide a translucent ceramic having a high linear transmittance and a high refractive index, substantially not causing double refraction, and exhibiting a high anomalous dispersion, and to provide a method for producing the same.

Another object of the invention is to provide a miniature optical component that can exhibit desired optical characteristics, and further an optical device including the optical component.

Means for Solving the Problems

The translucent ceramic of the invention comprises a pyrochlore compound represented by the general formula $A_xB_yO_w$ (wherein $1.00 \leq x/y \leq 1.10$ and w represents a positive number maintaining electroneutrality) as a main component. The main component has a cubic crystal system. It is noteworthy that the translucent ceramic of the invention has a pyrochlore structure and that the ceramic have a cubic crystal system for light transmission.

Whether or not the crystal system has a cubic crystal system depends on the elements constituting the A and B sites. Preferably, A is trivalent metallic element, and B is tetravalent metallic element. Particularly preferably, the A is at least one selected from the group consisting of La, Y, Gd, Yb, and Lu, and the B is at least one selected from the group consisting of Ti, Sn, Zr, and Hf.

Preferably, the translucent ceramic exhibits a high linear transmittance of 20% or more at a visible light wavelength of 633 nm (linear transmittance at a visible light wavelength of 633 nm hereinafter simply referred to as "linear transmittance") for a sample having a thickness of 0.4 mm.

Preferably, the translucent ceramic is polycrystalline from the viewpoint of reducing double refraction.

The invention is directed to a method for producing the translucent ceramic.

According to a first embodiment, the method for producing the translucent ceramic includes the steps of: preparing a ceramic green compact by forming a ceramic raw material powder into a predetermined shape; and firing the ceramic green compact in an atmosphere containing at least 98% by volume of oxygen.

According to a second embodiment, the method for producing the translucent ceramic includes the steps of: preparing a ceramic green compact by forming a ceramic raw material powder into a predetermined shape; preparing a co-firing composition having substantially the same composition as the ceramic raw material powder; and firing the ceramic green compact in an atmosphere containing at least 90% by volume of oxygen with the co-firing composition in contact with the ceramic green compact.

The first embodiment does not use the co-firing composition, but requires a higher oxygen concentration of at least 98% by volume for the firing atmosphere. On the other hand, the second embodiment uses the co-firing composition and performs the firing step with the co-firing composition in contact with the ceramic green compact. In this instance, the lower limit of the oxygen concentration of the firing atmosphere can be reduced to 90% by volume. According to the comparison between the translucent ceramics of both embodiments, the linear transmittance can be more increased by applying the method of the second embodiment.

When the method of the second embodiment is applied, preferably, the co-firing composition is in a powder state and the firing step is performed with the ceramic green compact buried in the co-firing composition.

The present invention is also directed to an optical component made of the translucent ceramic and an optical device including the optical component.

Advantages

The present invention can provide a translucent ceramic having a high linear transmittance and a high refractive index, substantially not causing double refraction, and exhibiting a high anomalous dispersion. Accordingly, the invention can provide a miniature optical component that exhibits desired optical characteristics and is useful to correct the chromatic aberration of white optical systems, such as a camera.

REFERENCE NUMERALS

Figure 1:
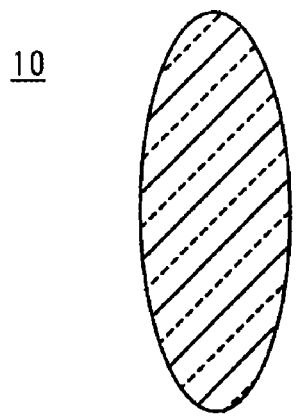
FIG. 1 is a sectional view of a double-convex lens 10 as a first embodiment of an optical component made of a translucent ceramic according to the present invention.
Figure 2:
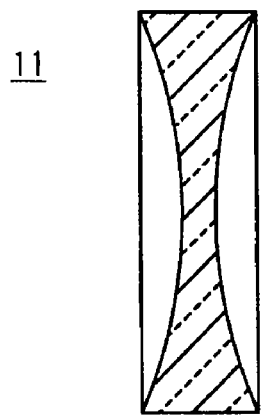
FIG. 2 is a sectional view of a double-concave lens 11 as a second embodiment of the optical component made of the translucent ceramic according to the present invention.
Figure 3:
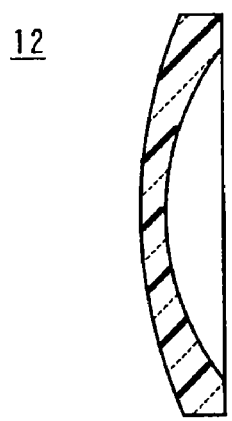
FIG. 3 is a sectional view of a meniscus lens 12 as a third embodiment of the optical component made of the translucent ceramic according to the present invention.
Figure 4:
FIG. 4 is a sectional view of an optical path length adjusting plate 13 as a fourth embodiment of the optical component made of the translucent ceramic according to the present invention.
Figure 5:
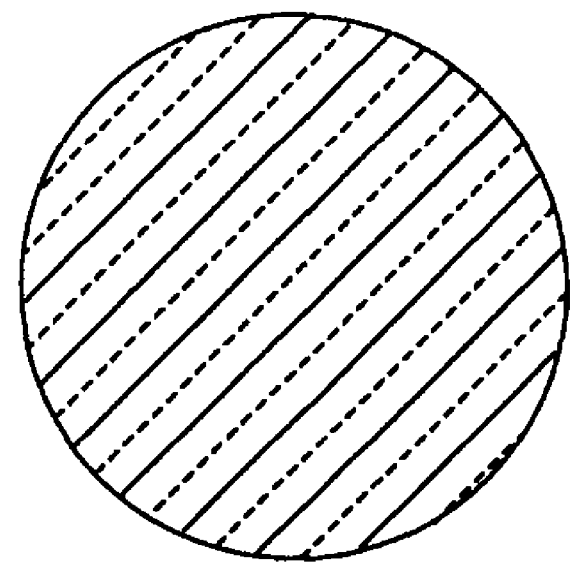
FIG. 5 is a sectional view of a spherical lens 14 as a fifth embodiment of the optical component made of the translucent ceramic according to the present invention.

1: recording medium
2: objective lens
3: half mirror
4: collimator lens
5: semiconductor laser
6: condenser
7: light-receiving element
8: laser light
9: optical pickup
10: double-convex lens
11: double-concave lens
12: meniscus lens
13: optical path length adjusting plate
14: spherical lens

BEST MODES FOR CARRYING OUT THE INVENTION

A translucent ceramic according to the present invention mainly comprises a pyrochlore compound represented by the general formula $A_x B_y O_w$ (wherein $1.00 \leq x/y \leq 1.10$ and w represents a positive number maintaining electroneutrality). The pyrochlore ceramic can be translucent when the ceramic have a cubic crystal system.

The translucent ceramic of the present invention does not substantially cause double refraction and can have a high linear transmittance and a high refractive index. In addition, the translucent ceramic can exhibit a higher anomalous dispersion than, for example, the translucent ceramic disclosed in Patent Document 3.

The anomalous dispersion will now be described. Optical glass generally has a substantially linear relationship between the partial dispersion ratio $\theta g, F$ and the Abbe number $v$. This type of glass is referred to as normal partial dispersion glass (normal glass). On the other hand, another type of glass, apart from the linear relationship, is referred to as anomalous partial dispersion glass (abnormal glass). The magnitude of the anomalous dispersion is represented by the deviation in partial dispersion ratio obtained from a standard line formed between K7 and F2, which are references of normal glass.

The partial dispersion ratio $\theta g, F$ is represented by Equation 1.

$$\theta g, F = (n_g - n_F)/(n_F - n_C) \qquad \text{Equation 1}$$

In the equation, n represents the refractive index and the subscripts represent the wavelengths of incident light, wherein the g-line wavelength is 435.83 nm, the F line wavelength is 486.13 nm, and the C line wavelength is 656.27 nm.

The Abbe number $v_d$ is represented by Equation 2.

$$v_d = (n_d - 1)/(n_F - n_C) \qquad \text{Equation 2}$$

In the equation, n represents the refractive index and the subscripts represent the wavelengths of incident light, wherein the d line wavelength is 587.56 nm.

That a material has a high anomalous dispersion means that the material has a different wavelength dispersion of refractive index from a normal glass optical material, and that the material is useful to correct the chromatic aberration of optical systems.

The translucent ceramic of the present invention has a negative anomalous dispersion $\Delta \theta g, F$, and it is as large as −0.026 to −0.017 according to the experimental example. The translucent ceramic of the present invention is thus suitable for optical systems in which the correction of chromatic aberration is important.

In the general formula $A_x B_y O_w$ representing the pyrochlore compound as the main component of the translucent ceramic of the present invention, the relationship $1.00 \leq x/y \leq 1.10$ is a requirement for light transmission. If the x/y value is outside in this range, the linear transmittance is reduced to less than 20%.

The translucent ceramic of the present invention requires that the main component have a cubic crystal system for light transmission. Whether or not the material is in a cubic system depends on the elements constituting the A and B sites of $A_xB_yO_w$. Preferably, the A is trivalent metallic element and the B is tetravalent metallic element. More preferably, the A is constituted of at least one element selected from the group consisting of La, Y, Gd, Yb, and Lu, and the B is at least one element selected from the group consisting of Ti, Sn, Zn, and Hf. In addition, the translucent ceramic of the present invention is preferably polycrystalline.

The translucent ceramic of the present invention may comprise inevitable impurities within a range not hindering the accomplishment of the objects of the invention. For example, impurities comprised in oxides or hydroxides used as the raw material or contaminating the raw material during manufacture include $SiO_2$, $Fe_2O_3$, $B_2O_5$, $Al_2O_3$, $W_2O_5$, $Bi_2O_3$, $Sb_2O_5$, and CuO.

The method for producing the translucent ceramic of the invention will now be described. The translucent ceramic can be produced typically by any one of the following two embodiments.

In a first embodiment for producing the translucent ceramic, a ceramic green compact is prepared by forming a ceramic raw material powder into a predetermined shape. Then, the ceramic green compact is fired in an atmosphere containing at least 98% by volume of oxygen.

In a second embodiment for producing the translucent ceramic, a ceramic green compact is prepared by forming a ceramic raw material powder into a predetermined shape, and a co-firing composition having substantially the same composition as the ceramic raw material powder is prepared. Then, the ceramic green compact is fired in an atmosphere containing at least 90% by volume of oxygen with the co-firing composition in contact with the ceramic green compact.

In the production methods above, the co-firing composition may be a powder produced by, for example, calcining a raw material prepared so as to have the same composition as the above-described ceramic compact, followed by pulverization. The co-firing composition can prevent the volatile component in the ceramic compact from vaporizing. Therefore, the firing step is preferably performed with the ceramic green compact buried in the co-firing composition. The form of the co-firing composition is not limited to powder, and may be a compact or a sintered compact.

The co-firing composition preferably has the same composition as the ceramic raw material powder for the above ceramic compact, but may have substantially the same composition. That the co-firing composition has substantially the same composition as the ceramic raw material powder for the ceramic green compact means that the co-firing composition is constituted of the same elements but may not be completely the same in proportion. Also, the co-firing composition may not necessarily have a composition enabling light transmission.

In the comparison between the first and the second embodiment, the first embodiment does not require the use of the co-firing composition, but must increase the oxygen concentration of the firing atmosphere to 98% by volume or more. On the other hand, the second embodiment can reduce the lower limit of the oxygen concentration to 90% by volume by use of the co-firing composition. Furthermore, the second embodiment can increase the linear transmittance of the resulting translucent ceramic to a level higher than that of the first embodiment.

The firing step may be performed at atmospheric pressure or lower in both the first and the second embodiment. It is not required to perform the firing step at a pressurized atmosphere, for example, in a HIP (hot isostatic press).

The translucent ceramic of the invention exhibits a high linear transmittance, and the linear transmittance can further be increased by forming an antireflection coating (AR coating) on the surface. The antireflection coating is preferably made of a dielectric material, such as MgO. For example, when the linear transmittance is 75.2% and the refractive index is 2.0868, the maximum theoretical linear transmittance is 77.9% according to Fresnel law. In this instance, the relative transmittance is 96.5% to the theoretical value. This means that transmission loss hardly occurs inside the sample. Thus, the linear transmittance can be increased to nearly the theoretical value by forming an antireflection coating over the surface of the sample.

The translucent ceramic of the invention can be used for optical components such as lenses. For example, the translucent ceramic may be used for a double-convex lens 10, a double-concave lens 11, a meniscus lens 12, an optical path length adjusting plate 13, or a spherical lens as shown in FIGS. 1 to 5, respectively.

An optical device including such an optical component will now be described using an optical pickup as an example.

Figure 6:
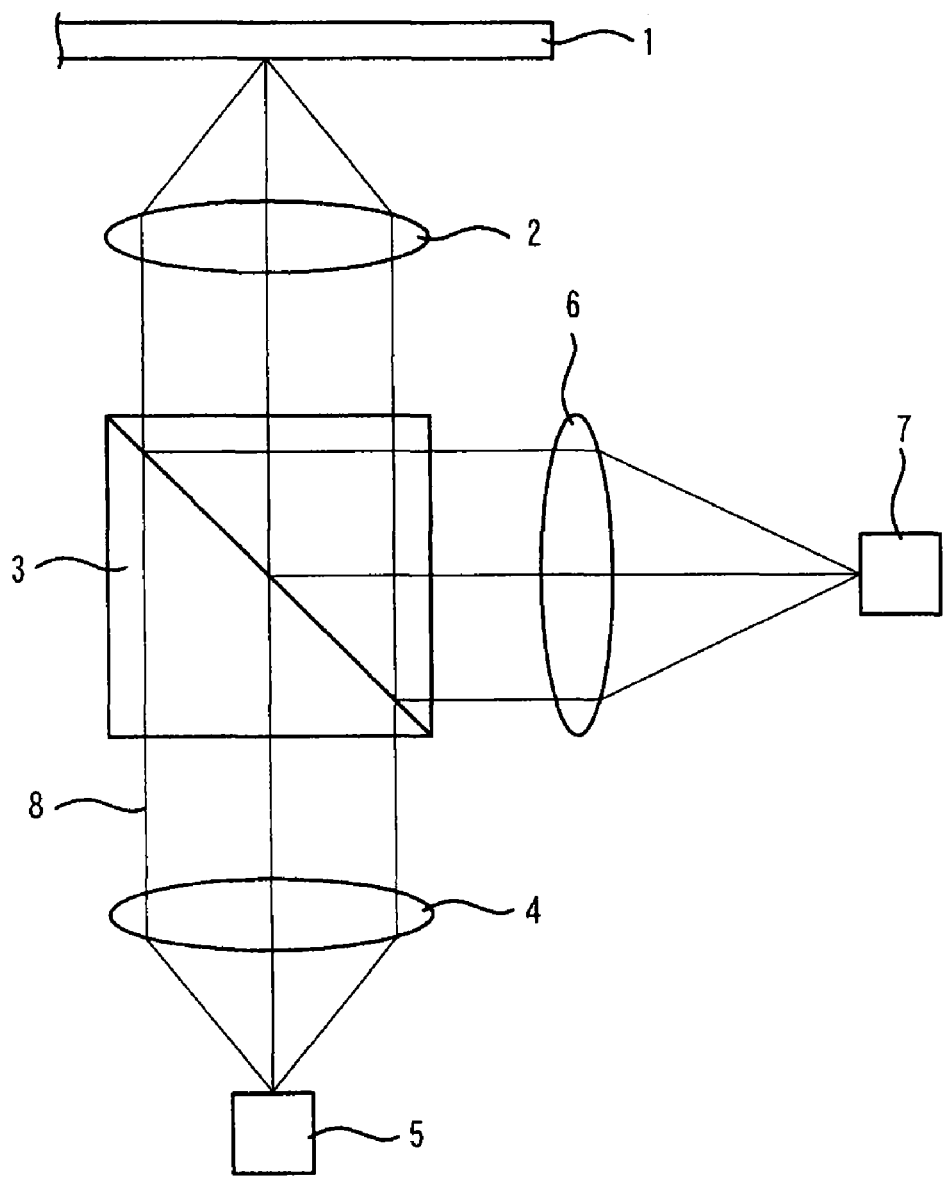
FIG. 6 is a schematic front view of an optical pickup 9 as an embodiment of an optical device including an optical component made of the translucent ceramic according to the present invention.

As shown in FIG. 6, the optical pickup 9 irradiates a recording medium 1, such as a compact disc or a minidisc, with coherent laser light 8, and reproduces the information recorded on the recording medium 1 with the reflection of the laser light.

The optical pickup 9 includes a semiconductor laser 5 as a light source, a collimator lens 4 that converts the laser light 8 from the semiconductor laser 5 into parallel light, and a half mirror 3 on the optical path of the parallel light. The half mirror 3 allows the light from the collimator lens 4 to travel in a straight line, and reflects reflected light from the recording medium 1 to turn the light about 90 degrees.

The optical pickup 9 also includes an objective lens 2 that collects light from the half mirror 3 on the recording surface of the recording medium 1. The objective lens 2 is intended to efficiently transmit the light reflected from the recording medium 1 to the half mirror 3. The half mirror 3 that has received the reflected light reflects the light to change the phase, thus turning the running direction of the reflected light.

The optical pickup 9 further includes a condenser 6 that collects the turned reflected light, and a light-receiving element 7 for reproducing information from the reflected light in a position where the reflected light is collected.

The translucent ceramic of the invention can be used as the material of the objective lens 2 of the optical pickup 9. Since the translucent ceramic of the invention has a high refractive index, the optical pickup 9 can be reduced in size and thickness.

The translucent ceramic of the invention will be further described with reference to experimental examples.

Experimental Example 1

Highly pure powders of La $(OH)_3$, $Y_2O_3$, $Gd_2O_3$, $Yb_2O_3$, $Lu_2O_3$, $SnO_2$, $ZrO_2$, $TiO_2$, and $HfO_2$ were prepared as raw materials. The raw materials were weighed out so as to prepare samples represented by the general formula $A_xB_yO_w$ (w represents a positive number maintaining electroneutrality) shown in Table 1, and were then wet-mixed in a ball mill for 20 hours. The resulting mixtures were dried and then calcined at 1300° C. for 3 hours to prepare calcined powders. The w value after calcination was about 7.

In the column "B site element and content" in Table 1, the content is the same as the y value when the B site is constituted of a single element, and the sum of the contents represents the y value when the B site is constituted of two elements.

Then, the calcined powder and an organic binder were placed in a ball mill and wet-pulverized for 12 hours. The organic binder was ethyl cellulose. Binders, other than ethyl cellulose may be used as long as they function as a binder for the ceramic compact and will react with oxygen in the air to turn into gas such as carbon dioxide or steam at about 500° C., thus disappearing in the firing step before the temperature reaches the sintering temperature. Such a binder may be polyvinyl alcohol.

After being dried, the pulverized material was granulated through a 50-mesh sieve. The resulting powder was pressed at 196 MPa to form a discoid ceramic green compact of 30 mm in diameter and 2 mm in thickness.

Then, the ceramic green compact was heated in the air in a firing furnace to remove the binder. Subsequently, oxygen was introduced into the firing furnace while the temperature was increased, and the oxygen concentration in the firing atmosphere was increased up to about 98% by volume in the maximum temperature range of 1600 to 1700° C. An optimum temperature was set as the maximum temperature according to the composition of the material. For example, the maximum temperature for Sample 6 was 1675° C. The compact was fired for 20 hours with the firing temperature and the oxygen concentration maintained, thus producing a sintered compact. The total pressure during firing was 1 atmospheric pressure.

The thus produced sintered compact was mirror-polished into a disk of 0.4 mm in thickness and used as a sample of the translucent ceramic.

The linear transmittance of each sample was measured at a wavelength $\lambda$ of 633 nm with a spectrophotometer (UV-2500) manufactured by Shimadzu Corporation. The target linear transmittance in the present invention was 20% or more.

The refractive indices were measured at wavelengths $\lambda$ of 409 nm, 532 nm, and 833 nm with a prism coupler (MODEL2010) manufactured by Metricon, and the constants a, b, and c were calculated from Equation 3 representing the relationship between the wavelength and the refractive index (Cauchy equation) using the refractive indices at the three wavelengths (409 nm, 532 nm, and 833 nm). Thus a relationship between the wavelength and the refractive index was obtained.

$n = a/\lambda^4 + b/\lambda^2 + c$ (n represents the refractive index, $\lambda$ represents the wavelength, a, b, and c are constants)   Equation 3

From this equation, refractive indices at three wavelengths (F line: 486.13 nm, d line: 587.56 nm, C line: 656.27 nm) required for calculating the Abbe number ($-v_d$) was obtained, and the Abbe number was calculated from the foregoing Equation 2 defining the Abbe number.

Furthermore, the refractive index $n_g$ at the g line (435.83 nm) was obtained from Equation 3, and the partial dispersion ratio $\theta g, F$ was calculated from Equation 1.

The anomalous dispersion $\Delta \theta g, F$ was determined by the following method well-known by those skilled in the art. Using K7 and F2 as reference glasses, the difference between a straight line connecting the points of these two glasses and $\theta g, F$ of the sample in a $\theta g, F - v d$ plot was determined as $\Delta \theta g, F$.

Table 1 shows the linear transmittance at 633 nm, the refractive index $n_d$ at the d line, the Abbe number $v_d$, and the anomalous dispersion $\Delta \theta g, F$ of the sample.

TABLE 1

| Sample number | A site element and content | B site element and content | x | y | x/y | Linear transmittance (%), 633 nm | Refractive index $n_d$ | Abbe number $v_d$ | Anomalous dispersion $\Delta \theta g, F$ |
|---|---|---|---|---|---|---|---|---|---|
| *1 | La: 1.800 | Zr: 2.000 | 1.800 | 2.000 | 0.900 | 0.3 | 2.0854 | 32.5 | −0.023 |
| *2 | La: 1.850 | Zr: 2.000 | 1.850 | 2.000 | 0.925 | 0.4 | 2.0861 | 32.5 | −0.023 |
| *3 | La: 1.900 | Zr: 2.000 | 1.900 | 2.000 | 0.950 | 0.4 | 2.0866 | 32.4 | −0.024 |
| *4 | La: 1.950 | Zr: 2.000 | 1.950 | 2.000 | 0.975 | 0.2 | 2.0870 | 32.4 | −0.024 |
| 5 | La: 2.000 | Zr: 2.000 | 2.000 | 2.000 | 1.000 | 67.2 | 2.0878 | 32.5 | −0.025 |
| 6 | La: 2.050 | Zr: 2.000 | 2.050 | 2.000 | 1.025 | 75.2 | 2.0868 | 32.4 | −0.025 |
| 7 | La: 2.100 | Zr: 2.000 | 2.100 | 2.000 | 1.050 | 61.1 | 2.0867 | 32.2 | −0.026 |
| 8 | La: 2.200 | Zr: 2.000 | 2.200 | 2.000 | 1.100 | 43.2 | 2.0867 | 32.4 | −0.026 |
| *9 | La: 2.400 | Zr: 2.000 | 2.400 | 2.000 | 1.200 | 11.8 | 2.0868 | 32.3 | −0.026 |
| 10 | La: 2.000 | Sn: 2.000 | 2.000 | 2.000 | 1.000 | 48.9 | 2.0408 | 32.3 | −0.017 |
| 11 | La: 2.000 | Ti: 2.000 | 2.000 | 2.000 | 1.000 | 22.7 | 2.2487 | 27.1 | −0.023 |
| 12 | La: 2.000 | Hf: 2.000 | 2.000 | 2.000 | 1.000 | 51.3 | 2.0349 | 32.5 | −0.025 |
| 13 | La: 2.000 | Zr: 1.6, Sn: 0.4 | 2.000 | 2.000 | 1.000 | 61.4 | 2.0759 | 32.8 | −0.023 |
| 14 | La: 2.000 | Zr: 1.2, Sn: 0.8 | 2.000 | 2.000 | 1.000 | 56.8 | 2.0657 | 32.9 | −0.022 |
| 15 | La: 1.6, Y: 0.4 | Zr: 2.000 | 2.000 | 2.000 | 1.000 | 54.7 | 2.0813 | 33.2 | −0.025 |
| 16 | La: 1.2, Y: 0.8 | Zr: 2.000 | 2.000 | 2.000 | 1.000 | 52.2 | 2.0766 | 32.9 | −0.025 |
| 17 | Y: 2.000 | Zr: 2.000 | 2.000 | 2.000 | 1.000 | 21.4 | 2.0612 | 34.6 | −0.027 |
| 18 | La: 1.6, Gd: 0.4 | Zr: 2.000 | 2.000 | 2.000 | 1.000 | 45.8 | 2.1110 | 31.4 | −0.023 |
| 19 | La: 1.2, Gd: 0.8 | Zr: 2.000 | 2.000 | 2.000 | 1.000 | 36.3 | 2.1050 | 30.4 | −0.023 |
| 20 | Gd: 2.000 | Zr: 2.000 | 2.000 | 2.000 | 1.000 | 30.4 | 2.0699 | 27.1 | −0.021 |
| 21 | La: 1.6, Yb: 0.4 | Zr: 2.000 | 2.000 | 2.000 | 1.000 | 38.1 | 2.0804 | 30.1 | −0.023 |
| 22 | La: 1.6, Lu: 0.4 | Zr: 2.000 | 2.000 | 2.000 | 1.000 | 35.8 | 2.0792 | 28.9 | −0.023 |

In Table 1, samples marked with an asterisk are outside the scope of the invention.

All the samples within the scope of the present invention exhibited linear transmittances of 20% or more and refractive indices of 2.03 or more, and the anomalous dispersion was as high as −0.026 to −0.017.

In contrast, Samples 1 to 4 and 9 outside the scope of the invention, in which the x/y value was outside the range of $1.00 \leq x/y \leq 1.10$, exhibited low linear transmittances of less than 20%.

Figure 7:
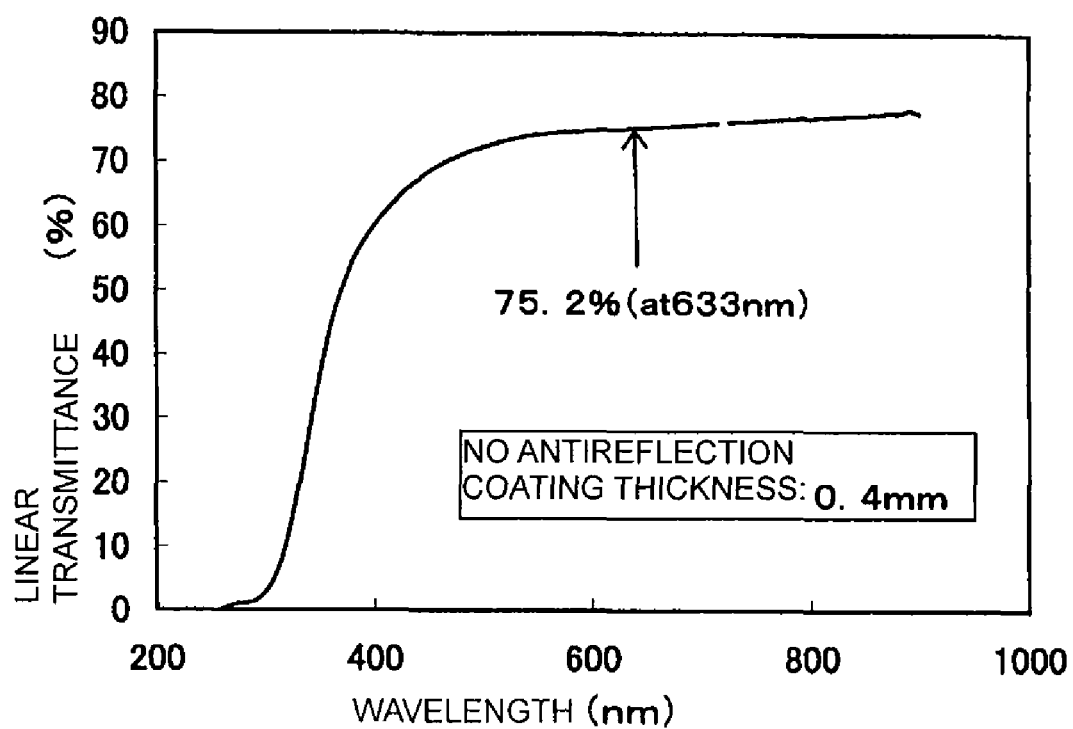
FIG. 7 is a plot showing the wavelength dependence of the linear transmittance of a translucent ceramic prepared as an experimental example within the scope of the invention.

Sample 6, which exhibited the highest linear transmittance of the samples shown in Table 1, was evaluated for the wavelength dependence of linear transmittance in the range of wavelengths of visible light ($\lambda = 350$ to 900 nm). The results are shown in FIG. 7.

Sample 6 exhibited a highest linear transmittance of 75.2% at 633 nm and a refractive index of 2.0868, as shown in Table 1. In the measurement of linear transmittance, in general, light perpendicularly enters the sample from the air, and is reflected from the front and rear surfaces of the sample (at the interfaces between the sample and the air). When the refractive index is 2.0868, the maximum theoretical linear transmittance calculated by subtracting the reflection at the rear surface of the sample is 77.9%. Sample 6, whose measured linear transmittance was 75.2%, has a relative transmittance of 96.5% to the theoretical value. This means that transmission loss hardly occurs inside the sample. Accordingly, by forming an antireflection coating over the surface of Sample 6, the linear transmittance is increased to substantially the theoretical value.

Experimental Example 2

Sintered compacts having the same composition as Sample 6 prepared in Experimental Example 1 were produced at respective firing temperatures of 1625° C. and 1700° C. These samples were prepared under the same conditions as in the preparation of Sample 6 in Experimental Example 1, except for the firing temperature.

The samples prepared at different firing temperatures were evaluated for the linear transmittance, the refractive index, and the Abbe number in the same manner as in Experimental Example 1. The results are shown in Table 2. Table 2 also shows the evaluation results of Sample 6 prepared in Experimental Example 1 (at a firing temperature of 1675° C.).

TABLE 2

| Firing temperature | Linear transmittance (%) 633 nm | Refractive Index $n_d$ | Abbe number $v_d$ |
| --- | --- | --- | --- |
| 1625° C. | 73.4 | 2.0866 | 32.4 |
| 1675° C. | 75.2 | 2.0866 | 32.4 |
| 1700° C. | 63.9 | 2.0866 | 32.4 |

As is clear from Table 2, the linear transmittances of the samples fired at 1625° C. or 1700° C. are slightly inferior to the sample fired at 1675° C. but were as sufficient as 20% or more. The refractive index and the Abbe number were substantially the same even though the firing temperature was varied. This suggests that the firing temperature for the translucent ceramic of the invention may be varied.

Experimental Example 3

A sintered compact having the same composition as Sample 6 prepared in Experimental Example 1 was produced under the same conditions as Sample 6 in Experimental Example 1, except that the firing was performed with the ceramic green compact buried in a powder of a co-firing composition having the same composition as the ceramic compact.

The sample fired using the co-firing composition was evaluated for the linear transmittance in the same manner as in Experimental Example 1. The result is shown in Table 3. Table 3 also shows the linear transmittance of Sample 6 produced in Experimental Example 1 (not using the co-firing composition).

TABLE 3

| Co-firing composition | Linear transmittance (%) 633 nm |
| --- | --- |
| Used | 77.0 |
| Not used | 75.2 |

Table 3 shows that the sample produced using the co-firing composition has a higher linear transmittance than the sample produced not using the co-firing comparison.

INDUSTRIAL APPLICABILITY

The translucent ceramic of the invention has a high linear transmittance and a high refractive index. The refractive index and the Abbe number can be adjusted in a wide range, and double refraction does not substantially occur. Furthermore, the anomalous dispersion is high. Accordingly, the translucent ceramic of the invention can be advantageously used particularly for optical systems in which the correction of chromatic aberration is important.

The invention claimed is:

1. An optical device comprising an optical component which is a translucent pyrochlore compound represented by the general formula $A_xB_yO_w$, wherein A comprises La, and B is at least one member selected from the group consisting of Sn, Zr, and Hf, $1.00 \leq x/y \leq 1.10$ and w represents a positive number maintaining electroneutrality, as a main component, and the main component has a cubic crystal system, and wherein said translucent compound has an antireflective coating on a surface thereof.

2. An optical device comprising an optical component which is a translucent pyrochlore compound represented by the general formula $A_xB_yO_w$, wherein A comprises La, and B is at least one member selected from the group consisting of Sn, Zr, and Hf, $1.00 \leq x/y \leq 1.10$ and w represents a positive number maintaining electroneutrality, as a main component, and the main component has a cubic crystal system.

3. An optical device according to claim 2, wherein the translucent ceramic has a linear transmittance of 20% or more at a visible light wavelength of 633 nm for a sample having a thickness of 0.4 mm.

4. An optical device according to claim 3, wherein the translucent ceramic is polycrystalline.

5. An optical device according to claim 4, wherein x is at least 2, y is 2, and B comprises Zr.

6. An optical device ceramic according to claim 5, wherein said translucent ceramic has an antireflective coating on a surface thereof.

7. An optical device according to claim 2, wherein the translucent ceramic is polycrystalline.

* * * * *